No. 718,834. PATENTED JAN. 20, 1903.
G. T. GODFREY.
TRAP FOR CATCHING FLEAS.
APPLICATION FILED AUG. 14, 1902.
NO MODEL.
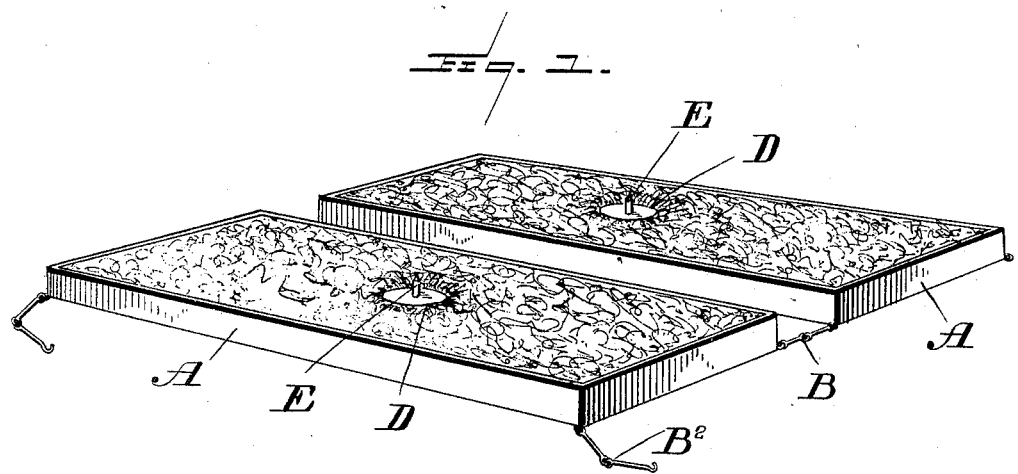
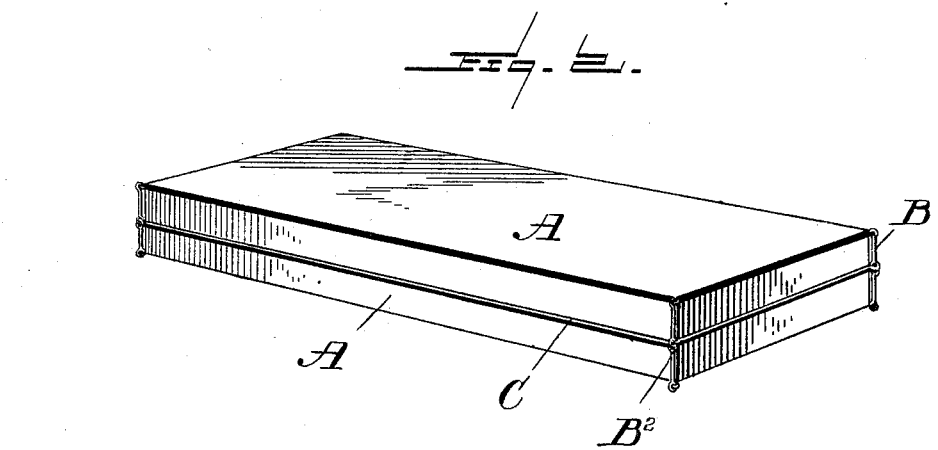
WITNESSES:
Wm. F. Doyle.
N. E. Emerson.
INVENTOR
Guy T. Godfrey,
BY Franklin H. Hough
Attorney

UNITED STATES PATENT OFFICE.

GUY T. GODFREY, OF ELDON, MISSOURI.

TRAP FOR CATCHING FLEAS.

SPECIFICATION forming part of Letters Patent No. 718,834, dated January 20, 1903.

Application filed August 14, 1902. Serial No. 119,676. (No model.)

*To all whom it may concern:*

Be it known that I, GUY T. GODFREY, a citizen of the United States, residing at Eldon, in the county of Miller and State of Missouri, have invented certain new and useful Improvements in Traps for Catching Fleas; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in traps for catching fleas; and it has for its object, among others, the provision of a simple, inexpensive, and serviceable trap of this character which while adapted for catching and destroying insect pests generally is especially adapted for use in destroying fleas.

I have found that the natural oil contained in sheep's wool is destructive to the life of fleas, and this fact I have utilized in the carrying out of my invention.

To these ends and to such others as the invention may pertain the same consists in the peculiar construction of the trap, as will be hereinafter described, shown in the accompanying drawings, and then specifically defined in the appended claims.

The invention is clearly illustrated in the accompanying drawings, which, with the letters of reference marked thereon, form a part of this specification, and in which drawings—

Figure 1 is a perspective view of a flea-trap constructed in accordance with my invention, the trap being shown as opened or set. Fig. 2 is a like view of the trap as it appears when the parts are folded together.

Reference now being had to the details of the drawings by letter, A A represent the two sections of the trap, which may consist of two trays, frames, or boards, preferably rectangular in form and of equal size. These frames are hinged together and are adapted to be folded one upon the other. The hinged connections B and the hooks B², which latter serve as a connecting means for holding the outer edges of the frames in their relative position when folded, are of such length as to prevent the frames from coming into contact when folded one upon the other, a space C intervening between them for a purpose which will presently appear.

The upper faces of each of the sections or frames A are provided with a covering of sheepskin with the wool upward or exposed, and each of the frames or sections is provided with one or more spaces D, which are formed by removing the wool, and each of these spaces D is provided with a pin E for the reception of bait.

When the trap is designed for use in catching fleas, the hinged sections of the trap are opened outward, as shown in Fig. 1 of the drawings, and a small piece of fresh meat, preferably liver, is placed upon the bait-receiving pegs E. The trap when thus set is placed upon the floor, a table, or other convenient place within the apartment which it is designed to rid of fleas. The insects being attracted by the bait are brought into contact with the natural oil contained in the wool surrounding the bait and are killed thereby. Fleas being nocturnal in their habits spend the day-time in darkened crevices, and it is my purpose to fold the trap as shown in Fig. 2 and leave the same in this condition during daylight. The space C will thus afford a convenient space within which the insects in seeking refuge from the light will enter the trap.

While my trap is especially designed and intended for use in catching fleas, it is at once evident that the same may be used for destroying insect pests of all kinds, it being simply necessary to substitute for the bait which I have described as adapted for use in catching fleas such other bait as may be adapted for use in attracting other kinds of insects. It is also at once evident that the wool surfaces of the trap-sections may be supplied with poisonous materials or substances which will serve to destroy insect life.

Having thus described my invention, what I claim to be new, and desire to secure by Letters Patent, is—

1. A trap for catching fleas, the same consisting of a board or frame, having stretched thereon a covering of sheepskin with the wool exposed, and having an open space provided with a pin or peg for the reception of bait, substantially as described.

2. A trap of the character described, the same comprising two hinged sections, each section being provided with a covering of sheepskin and each provided with a space from which the wool is removed and a pin or peg within said space for the reception of bait, substantially as described.

3. A trap for catching fleas and other insects, the same comprising two hinged sections, each having its upper face provided with sheepskin surface and each provided with a space and peg or pin for the reception of bait, as described, the hinged connections between sections, being of such a character as to allow a contracted open space to intervene between the wool surfaces upon the meeting faces of the trap-sections, when the same are folded one upon the other, substantially as described and for the purpose specified.

In testimony whereof I hereunto affix my signature in presence of two witnesses.

GUY T. GODFREY.

Witnesses:
W. P. BERRY,
EMMET E. HART.